US012379251B2

(12) United States Patent
Fantini et al.

(10) Patent No.: US 12,379,251 B2
(45) Date of Patent: Aug. 5, 2025

(54) METHOD AND APPARATUS FOR SPECTROPHOTOMETRY OF TURBID MEDIA

(71) Applicant: Trustees of Tufts College, Medford, MA (US)

(72) Inventors: Sergio Fantini, Winchester, MA (US); Giles Blaney, Somerville, MA (US); Angelo Sassaroli, Arlington, MA (US)

(73) Assignee: Trustees of Tufts College, Medford, MA (US)

( * ) Notice: Subject to any disclaimer, the term of this patent is extended or adjusted under 35 U.S.C. 154(b) by 216 days.

(21) Appl. No.: 18/276,300

(22) PCT Filed: Feb. 7, 2022

(86) PCT No.: PCT/US2022/015445
§ 371 (c)(1),
(2) Date: Aug. 8, 2023

(87) PCT Pub. No.: WO2022/170168
PCT Pub. Date: Aug. 11, 2022

(65) Prior Publication Data
US 2024/0110832 A1    Apr. 4, 2024

Related U.S. Application Data

(60) Provisional application No. 63/146,867, filed on Feb. 8, 2021.

(51) Int. Cl.
*G01J 3/42* (2006.01)
*G01J 3/28* (2006.01)
(Continued)

(52) U.S. Cl.
CPC ............ *G01J 3/42* (2013.01); *G01N 21/0303* (2013.01); *G01N 21/31* (2013.01);
(Continued)

(58) Field of Classification Search
CPC .......... G01J 3/42; G01J 3/28; G01N 21/0303; G01N 21/31; G01N 21/3103;
(Continued)

(56) References Cited

U.S. PATENT DOCUMENTS 4,805,623 A * 2/1989 Jobsis ................ A61K 49/0002
356/41
6,122,042 A * 9/2000 Wunderman ........ A61B 1/0607
356/73

(Continued)

FOREIGN PATENT DOCUMENTS

DE    69535012 T2  *  1/2007  ......... A61B 5/14553
SE     1100262 A1  * 10/2012  ............. G01N 21/05

OTHER PUBLICATIONS

Nayeem, Huzaifa, Azeemuddin Syed, and Md Zafar Ali Khan. "Low cost wavelength specific water quality measurement technique." 2019 41st Annual International Conference of the IEEE Engineering in Medicine and Biology Society (EMBC). IEEE, 2019. (Year: 2019).*

(Continued)

*Primary Examiner* — Michelle M Iacoletti
*Assistant Examiner* — Noah J. Haney
(74) *Attorney, Agent, or Firm* — Occhiuti & Rohlicek LLP

(57) ABSTRACT

A self-calibrating hybrid spectrophotometer comprises a receptacle for receiving the cuvette, first and second optodes that are configured to permit light to enter the cuvette, third and fourth optodes that are configured to permit light to leave the cuvette, and a controller that is configured to control delivery of light to one of the first and second optodes. Light entering one of the first and second optodes is received at the third and fourth optodes after having interacted with the turbid sample along different paths having different lengths. Measurements made at the third (Continued)

and fourth optodes in response to having illuminated both the first and second source optodes provide two slopes of optical transmittance as a function of path length. The spectrophotometer uses these slopes to identify a slope that is indicative of the absorption coefficient and the reduced scattering coefficient of the sample.

20 Claims, 3 Drawing Sheets

(51) Int. Cl.
    *G01N 21/03*     (2006.01)
    *G01N 21/17*     (2006.01)
    *G01N 21/31*     (2006.01)
    *G01N 21/47*     (2006.01)
    *G01N 21/51*     (2006.01)

(52) U.S. Cl.
    CPC ..... *G01N 21/3103* (2013.01); *G01N 21/4785* (2013.01); *G01N 21/51* (2013.01); *G01J 3/28* (2013.01); *G01N 2021/1744* (2013.01); *G01N 2201/0668* (2013.01); *G01N 2201/08* (2013.01)

(58) Field of Classification Search
    CPC ............... G01N 21/4785; G01N 21/51; G01N 2021/1744; G01N 2201/0668; G01N 2201/08; G01N 21/05; G01N 21/3151
    USPC .................................................. 356/319, 326
See application file for complete search history.

(56) References Cited

U.S. PATENT DOCUMENTS

| | | | |
|---|---|---|---|
| 6,335,792 B1* | 1/2002 | Tsuchiya | G01N 21/4795 356/432 |
| 6,850,656 B1 | 2/2005 | Bevilacqua et al. | |
| 7,428,434 B2* | 9/2008 | Tromberg | A61B 5/0091 600/407 |
| 10,139,388 B2* | 11/2018 | Sterenborg | A61B 5/0075 |
| 10,408,741 B2* | 9/2019 | Hwang | G01N 33/4925 |
| 11,473,976 B2* | 10/2022 | Schwab | G01J 3/10 |
| 2009/0103085 A1 | 4/2009 | Hu | |
| 2012/0236306 A1 | 9/2012 | Ostermeyer | |
| 2014/0320859 A1* | 10/2014 | Thennadil | G01N 21/59 356/432 |
| 2018/0070830 A1* | 3/2018 | Sutin | A61B 5/72 |
| 2018/0172615 A1 | 6/2018 | Lau | |

OTHER PUBLICATIONS

International Search Report and Written Opinion, PCT Application No. PCT/US2022/015445, mailed May 13, 2022 (9 pages).

* cited by examiner

METHOD AND APPARATUS FOR SPECTROPHOTOMETRY OF TURBID MEDIA

RELATED APPLICATIONS

This application is a 371 national stage application of International Application No. PCT/US2022/015445, filed on Feb. 7, 2022, which claims the benefit of the Feb. 8, 2021 priority date of U.S. Provisional Application 63/146,867, the contents of which are herein incorporated by reference.

STATEMENT OF GOVERNMENT RIGHTS

This invention was made with government support under grant R01 095334 awarded by NIH on Jul. 5, 2016. The government has certain rights in the invention.

FIELD OF INVENTION

This application pertains to spectrophotometry and in particular to quantitative measurement of broadband absorption spectra in optically turbid media.

BACKGROUND

As light travels through a medium, it interacts with that medium. A common type of interaction is "scattering." Scattering causes certain media to be opaque or translucent. It occurs when the medium contains scattering centers having an appropriate size relative to the light's wavelength. This occurs, for example, in lipid emulsions, such as milk, and particulate suspensions, such as muddy water. This phenomenon, which is often called "turbidity," is highly dependent on wavelength.

Another common interaction between light and a medium is absorption. This is what imparts colors to certain liquids. Unlike scattering, which is easily explained by classical electromagnetism, absorption is a quantum-mechanical phenomenon. Like scattering, absorption is also highly dependent on wavelength. However, unlike scattering, in which the relationship between particle size and wavelength is paramount, absorption's dependence on wavelength is dictated by the atomic and molecular structure of the particle in question. As a result, absorption tends to occur at isolated frequencies or frequency bands that, on inspection, bear no obvious relationship to each other.

For the foregoing reason, absorption has become useful as a way to identify substances in a medium. Each substance will absorb only selected wavelengths that are sometimes quite distant from each other or will feature a specific dependence of absorption on wavelength. The set of absorbed wavelengths and the dependence of absorption on wavelength defines a "spectrum" of that substance. This spectrum, having arisen as a result of that substance's unique atomic and molecular structure, serves as a fingerprint for that substance. An instrument that measures this spectrum is typically called a "spectrophotometer."

To ascertain a spectrum, the spectrophotometer illuminates a sample with broadband light and then detects light that has interacted with the sample. This provides a spectrum from which one can infer the content of the sample. The sample itself is placed in a small cuvette that is inserted into the spectrophotometer. This means that only a small amount of sample is required.

A difficulty arises when the sample scatters in the same wavelength range that the spectrophotometer is examining. The spectrophotometer cannot easily distinguish the effect of scattering from the effect of absorption. This tends to impair the spectrophotometer's function.

SUMMARY

In one aspect, the invention features a spectrophotometer for analysis of light that has passed through a turbid sample in a cuvette. This turbid sample has a wavelength-dependent absorption coefficient and a wavelength-dependent reduced scattering coefficient. The spectrophotometer is a self-calibrating hybrid spectrophotometer that comprises a receptacle for receiving the cuvette, first and second optodes that are configured to permit light to enter the cuvette when the cuvette has been received in the receptacle, third and fourth optodes that are configured to permit light to leave the cuvette when the cuvette has been received in the receptacle, and an illumination controller that is configured to control delivery of light to a selected one of the first and second optodes. Light entering one of the source optodes is received at the third and fourth optodes after having interacted with the turbid sample along different inter-optode paths having different path lengths. Measurements made at the third and fourth optodes in response to having selected both the first and second source optodes for delivery of light into the cuvette provide first and second slopes of optical transmittance as a function of path length. The spectrophotometer is configured to use the first and second slopes to identify a third slope. This third slope is indicative of the absorption coefficient and the reduced scattering coefficient of the turbid sample.

In some embodiments, a first pair of paths comprises a path that extends between the first optode and the third optode and a path that extends between the first optode and the fourth optode.

A difference between path lengths of the paths defines a first path-length differential. A difference between measurements made at the third and fourth optodes, when divided by the first path-length differential, defines the first slope.

Meanwhile, the second pair of paths comprises a path that extends between the second optode and the third optode and a path that extends between the second optode and the fourth optode. As was the case earlier, a difference between path lengths of the paths defines a second path-length differential. A difference between measurements made at the third and fourth optodes, when divided by the second path differential, defines the second slope.

Embodiments further include those in which the spectrophotometer is configured to use the first and second slopes for self-calibration. Among these are embodiments in which the third slope is between the first and second slopes, as is the case, for example, when the third slope is a weighted average of the first and second slopes. Also among these embodiments are those in which the third slope is an average of the first and second slopes.

Embodiments further include those having first and second spectrometers that receive measurements from the detector optodes. Among these are embodiments in which the first spectrometer receives a measurement across a continuous range of wavelengths and the second spectrometer receives measurements at discrete first and second wavelengths that are within the range. Also among these are embodiments in which the spectrometers include a frequency-domain spectrometer and a continuous wave broadband spectrometer, both of which receive measurements made using the third and fourth optodes when at most one of the first and second optodes passes light into the cuvette.

Still other embodiments feature first and second illumination systems for providing light to the source optodes, respectively. Each such illumination system includes a broadband source that provides light over a continuous range of wavelengths and monochromatic light sources for providing the first and second optodes with light at corresponding first and second wavelengths within the continuous range.

Other embodiments include analysis circuitry that determines the absorption coefficient and the reduced scattering coefficient based at least in part on measurements made at the third and fourth optodes.

In other embodiments, the spectrophotometer includes spectrometers and analysis circuitry that receives measurements from the spectrometers. The analysis circuitry is configured to extract, from measurements made by the first and second spectrometers, the absorption coefficient based on a relationship between the slope and the absorption coefficient and a relationship between the slope and the reduced scattering coefficient. Embodiments include those in which the analysis circuitry comprises diffusion-theory circuitry that implements a diffusion model that models the light as particles diffusing through the turbid medium, in which case the analysis circuitry determines the absorption coefficient and the reduced scattering coefficient based at least in part on a result of the diffusion model. Also among these embodiments are those in which the analysis circuitry comprises numerical-solution circuitry that numerically solves a differential equation that models propagation of light through the cuvette, in which case the analysis circuitry is configured to determine the absorption coefficient and the reduced scattering coefficient based at least in part on a solution to the differential equation. Also among these embodiments are those in which the analysis circuitry comprises simulation circuitry that implements a simulation of propagation of light through the cuvette, in which case the analysis circuitry is configured to determine the absorption coefficient and the reduced scattering coefficient based at least in part on a result of the simulation. Still others of these embodiments include those in which the analysis circuitry comprises a lookup table that contains information indicative of a relationship between the slope and the absorption coefficient and a relationship between the slope and the reduced scattering coefficient, in which case the analysis circuitry is configured to determine the absorption coefficient and the reduced scattering coefficient based at least in part on the lookup table.

In another aspect, the invention features using a spectrophotometer for analysis of light that has passed through a turbid sample in a cuvette, the turbid sample having a wavelength-dependent absorption coefficient and a wavelength-dependent reduced scattering coefficient. Such a method includes inserting the cuvette, which contains the turbid sample, in a receptacle of the spectrophotometer, coupling first, second, third, and fourth optodes to the cuvette to permit light to enter the cuvette through the first and second optodes and to permit light to leave the cuvette through the third and fourth optodes, selecting a light source, illuminating the first optode with the light source, making a measurement at the third and fourth optodes, based on the measurement and locations of the first, third, and fourth optodes relative to each other, obtaining a first slope of optical transmittance as a function of path length, illuminating the second optode with the light source, making a measurement at the third and fourth optodes, based on the measurement and locations of the second, third, and fourth optodes relative to each other, obtaining a second slope of optical transmittance as a function of path length, and using the first and second slopes to obtain a third slope, the third slope being indicative of the absorption coefficient and the reduced scattering coefficient of the turbid sample.

Among the practices are those that include selecting the light source to be a broadband light source that provides illumination over a continuum of wavelengths within a range of wavelengths, selecting the light source to be a monochromatic light source at a first wavelength, and selecting the light source to be a monochromatic light source at a second wavelength, the first and second wavelengths being within the continuum of wavelengths.

Also among the practices are those that include estimating a wavelength-dependent absorption coefficient based at least in part on the third slope.

Still other practices are those in which using the first and second slopes to obtain a third slope comprises averaging the first and second slopes and those in which using the first and second slopes to obtain a third slope comprises selecting the third slope to be between the first and second slopes.

All methods and systems described herein are non-abstract in nature. Accordingly, the claims are restricted to only those systems and methods that are non-abstract. As used herein, "non-abstract" is the converse of "abstract" as that term has been defined by the Supreme Court and Federal Circuit as of the filing date of this application. Accordingly, any person who construes the claims as abstract will simply be proving that it is possible to incorrectly construe claims contrary to the specification.

Attempts have been made to carry out the claimed steps in the human mind. These attempts have been unsuccessful. Accordingly, it is not unreasonable to infer that the claimed steps cannot, in fact, be carried out wholly in the human mind.

Attempts have also been made to practice the claimed subject matter on a generic computer. These attempts have likewise been unsuccessful. Accordingly, it is reasonable to infer that, in fact, a computer that carries out any portion of the claimed subject matter would be a non-generic computer.

DETAILED DESCRIPTION

Figure 1:
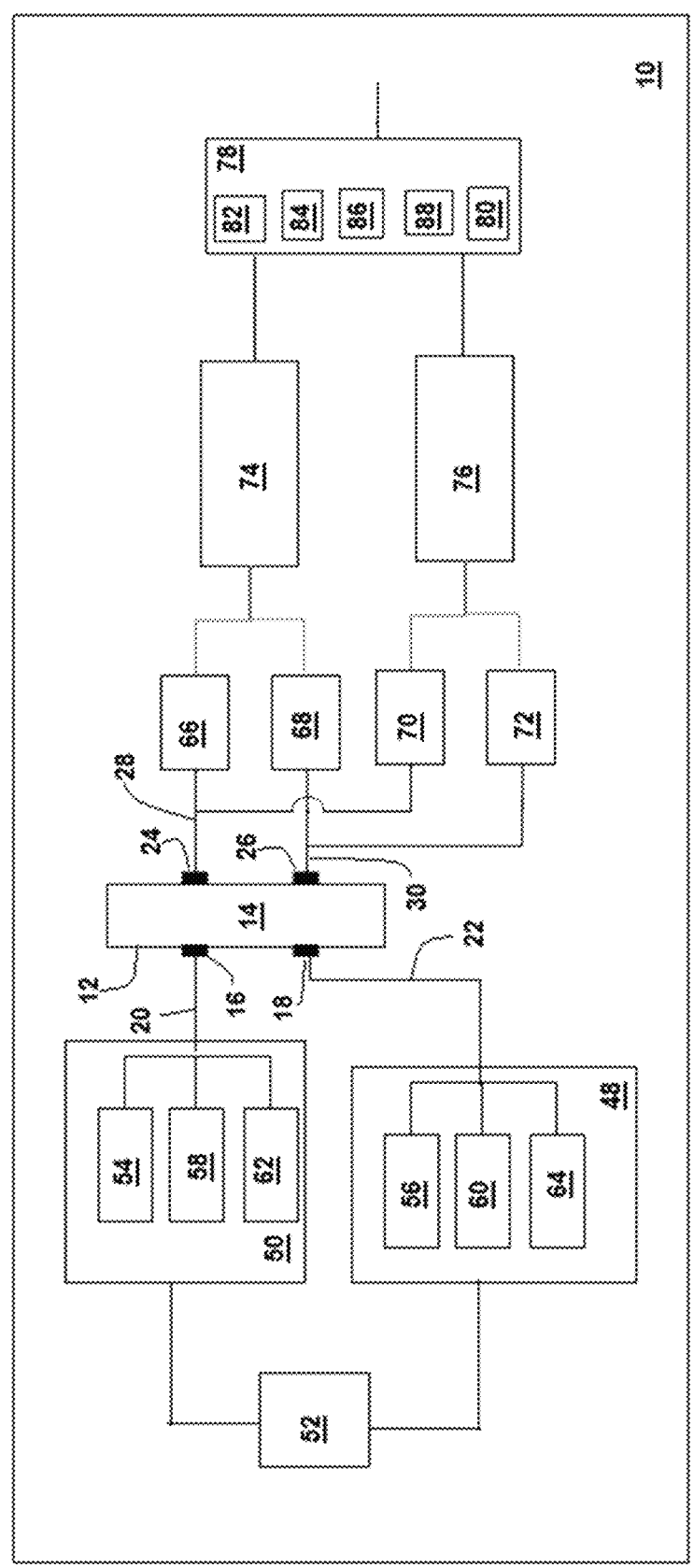
FIG. 1 shows a hybrid spectrophotometer for determining the absorption coefficient of a turbid sample in a cuvette across a continuum of wavelengths.

FIG. 1 shows a hybrid spectrophotometer 10 having a receptacle 12 that receives a cuvette 14 filled with a turbid sample. The cuvette 14 has first and second faces that are opposite each other. First and second optodes 16, 18 mounted on the cuvette's first face couple light traveling in corresponding first and second fibers 20, 22 into the cuvette 14. Similarly, third and fourth optodes 24, 26 mounted on the cuvette's second face receive light that has had the opportunity to interact with the turbid sample in the cuvette 14 and couple that light into corresponding third and fourth fibers 28, 30.

Figure 2:
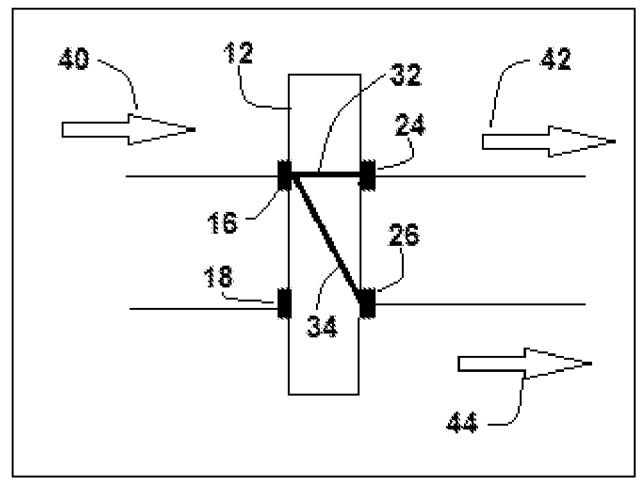
FIG. 2 shows details of the cuvette in FIG. 1 with a first set of two inter-optode distances.

Referring now to FIG. 2, light emitted by the first optode 16 will have traversed one of two paths: a first short path 32, which extends between the first optode 16 and the third optode 24, and a first long path 34, which extends between the first optode 16 and the fourth optode 26. The pathlength difference between the first long path and the first short path defines a first differential path length.

Figure 3:
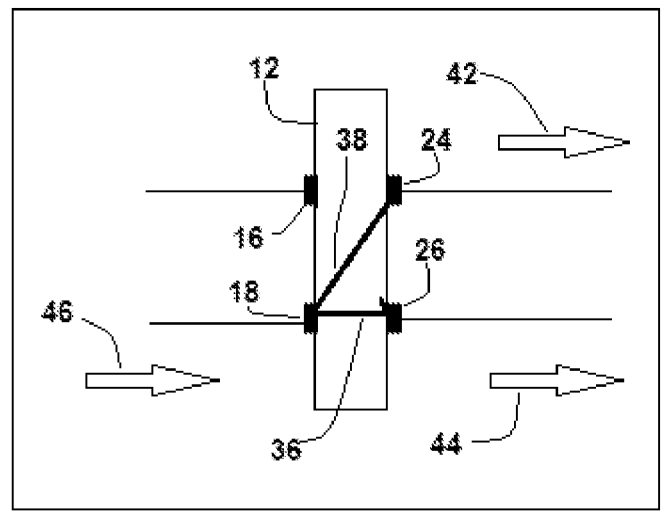
FIG. 3 shows details of the cuvette in FIG. 1 with a second set of two inter-optode distances.

As shown in FIG. 3, the same situation arises in connection with the second optode 18. Light emitted by the second optode 18 will likewise have traversed one of two paths: a second short path 36, which extends between the second optode 18 and the fourth optode 26, and a second long path 38, which extends between the second optode 18 and the third optode 24. The pathlength difference between the second long path and the second short path defines a second differential path length. In a preferred embodiment, the first differential path length and the second differential path length are equal.

As light travels across the cuvette 14, it interacts with the turbid sample. This interaction includes a combination of scattering interactions and absorption interactions. These interactions both depend on wavelength. The hybrid spectrophotometer operates to separate the wavelength-dependent absorption from all other interactions with the turbid sample.

The extent of light's interaction with the turbid sample depends on the path length through the turbid sample. Thus, if some unknown first input-power 40 were to enter through the first optode 16, a measurement of output power 42 at the third optode 24 would differ from a measurement of output power 44 at the fourth optode 26. This difference amounts to a first differential transmittance for the turbid sample. Since the first differential path length is known, because the geometry is known, it is possible to obtain, for each wavelength, a ratio of differential transmittance to the first differential path length. This defines a first slope, the slope being that of output power as a function of path length through the turbid sample. This first slope can be used in connection with determining the absorption coefficient.

Similar reasoning applies to the geometry of FIG. 3, in which an unknown second input-power 46 enters the second optode 18 and measurements of output power 42, 44 at the third and fourth optodes 24, 26 are available. Thus, it is also possible to define a second slope in the same way as discussed in connection with FIG. 2.

The first slope is essentially independent of the first input-power 40 and the second slope is essentially independent of the second input-power 46 In effect, if one posits a linear relation between output power 42, 44 and first input-power 40, then the input power 40 simply changes the intercept of that first line but not its slope. The same reasoning applies to the second input-power 46, which likewise simply changes the intercept of that second line but not its slope. As a result, there is no need to actually measure either the first or second input-power 40, 46. As a result, the hybrid spectrophotometer 10 is capable of self-calibration in relation to source power.

In principle, given the apparent symmetry shown in FIGS. 1-3 and the assumption of a homogeneous turbid sample, the first and second slopes should be identical. Therefore, in principle, either the first or second slope can be used in connection with determining the absorption coefficient. In practice, the first and second slope are also affected by the individual sensitivities of the detectors used to measure output power 42, 44. Below we describe how the hybrid spectrophotometer 10 also realizes self-calibration in relation to detector sensitivity.

The first and second source fibers 20, 22 connect to corresponding first and second illumination systems 48, 50, both of which are controlled by an illumination controller 52.

Each illumination system 48, 50 includes a broadband source 54, 56, a first monochromatic source 58, 60, and a second monochromatic source 62, 64. Each broadband source 54, 56 outputs light across a continuous range of wavelengths, each first monochromatic source 58, 60 outputs light at a first wavelength within that range, and each second monochromatic source 62, 64 outputs light at a second wavelength within that range. Monochromatic sources 58, 60, 62, 64 are intensity-modulated at a radiofrequency to implement frequency-domain spectroscopy.

Naturally, implementations exist in which a single source can output either a continuum of wavelengths or individual wavelengths. The foregoing implementation of an illumination system 48, 50 is thus offered only by way of example.

The first and second broadband sources 54, 56 do so in a way that makes it possible to identify which of the first and second broadband sources 54, 56 is carrying out the illumination. In some embodiments, the first and second broadband sources 54, 56 are multiplexed in time, for example by the first and second broadband sources 54, 56 being turned on and off out of phase or by providing a moving shutter that achieves a similar effect. In other embodiments, the first and second broadband sources 54, 56 are multiplexed in frequency, for example by providing a modulator that modulates their respective outputs at different frequencies.

Similarly, first monochromatic sources 58, 60 and second monochromatic sources 62, 64 emit light in a way that makes it possible to identify which of the first and second monochromatic sources 58, 60, 62, 64 is carrying out the illumination. As described above for broadband sources, in some embodiments the monochromatic sources may be multiplexed in time, and in other embodiments they may be multiplexed in frequency.

The third fiber 28 conveys light from the third optode 24 to a first detector 66 and a third detector 70. Similarly, the fourth fiber 30 conveys light from the fourth optode 26 to a second detector 68 and to a fourth detector 72. The first and second detectors 66, 68 ultimately provide detected light to a first spectrometer 74. The third and fourth detectors 70, 72 provide detected light to a second spectrometer 76.

As a practical matter, the various components of the spectrophotometer 10 are unlikely to be completely identical. Moreover, their properties may also vary over time. As described above, the hybrid spectrophotometer 10 carries out self-calibration in relation to source power. Inevitably, there will be also variations between the performance characteristics of the various detectors 66, 68, 70, 72. As a result of these variations, the detectors 66, 68, 70, 72 will introduce contributions to the previously described first and second slopes of transmittance versus path length. However, because of the special arrangement of the optodes 16, 18, 24, 26 at the faces of cuvette 14, the detectors' contributions have an equal magnitude and opposite signs in the first slope and second slope. Therefore, by taking an average of the first slope and the second slope, the hybrid spectrometer 10 realizes self-calibration in relation to detector sensitivity as well. By correcting for variability in the input power 40, 46 delivered to the cuvette 14, as well as variability in the measured output power 42, 44 from the cuvette, the hybrid spectrophotometer effectively calibrates itself and operates in a fully self-calibrated mode.

The analysis circuitry 78 determines an estimate of slope that accounts for the errors that result from variations in the performances of the spectrophotometer's illumination systems 48, 50, its detectors 66, 68, 70, 72, the light transmission through optical fibers 20, 22, 28, 30, and optical coupling with the cuvette 14 at the optodes 16, 18, 24, 26

The analysis circuitry 78 takes the average of the two measured slopes, thus correcting for the effects of manufacturing variations and improving the estimate of the slope that is associated with only the sample. As mentioned above, this causes the spectrophotometer 10 to effectively calibrate itself.

The resulting spectrophotometer 10, with its built-in self-calibration feature, is thus largely insensitive to component variability and to variations in input power 40, 46 and measurements of output power 42, 44 that will be used in connection with determining the unknown absorption coefficient of the turbid sample. This avoids the need to constantly be calibrating for unknown and variable emission properties of the illumination systems 48, 50 and of the responsiveness of the various detectors 66, 68, 70, 72.

The first spectrometer 74 is one that is configured to estimate, based on light across a continuum of wavelengths, a wavelength-dependent transmittance slope, which is associated with the optical properties (absorption and scattering) of the turbid sample. Thus, the first spectrometer 74 uses light provided by the first and second broadband sources 54, 56. Accordingly, the first and second detectors 66, 68 are broadband detectors that are operable to detect radiation across the continuous range of wavelengths used by the broadband sources 54, 56 and that also have the ability to provide spectrally resolved measurements at each individual wavelength within the detected range.

In a preferred embodiment, the first spectrometer 74 is a continuous wave broadband spectrometer that measures a transmittance slope for the turbid sample over a continuum of wavelengths and provides this transmittance slope to analysis circuitry 78.

At each wavelength, the transmittance slope measured by the first spectrometer 74 incorporates the effects of both the absorption coefficient and the scattering coefficient at that wavelength. However, these two coefficients are not separable from simply knowing the transmittance slope. To separate them, more information is needed. This information is provided by the second spectrometer 76.

The third detector 70 provides measurements of output power carried by light that has made its way across the cuvette 14 to the third optode 24. Similarly, the fourth detector 72 provides measurements of output power carried by light that has made its way across the cuvette 14 to the fourth optode 26.

The second spectrometer 76 uses the measurements from the third and fourth detectors 70, 72 to measure a reduced scattering coefficient at discrete wavelengths at which absorption occurs. It then provides those measurements to the analysis circuitry 78. In a preferred embodiment, the second spectrometer 76 is a frequency-domain spectrometer that provides amplitude and phase measurements of the modulated signals resulting from the monochromatic sources 58, 60, 62, 64.

The analysis circuitry 78 thus acquires two sets of measurements. The first set, which comes from the first spectrometer 74, is a measurement of transmittance slope that is continuous across wavelength. The second set, which comes from the second spectrometer 76, is a measurement of the reduced scattering coefficient that is discontinuous across wavelength.

To fill in the gaps between the wavelengths at which the second spectrometer 76 provides its measurements, the analysis circuitry 78 provides extrapolation circuitry 80 that assumes a particular dependence of the reduced scattering coefficient on wavelength. An empirically valid assumption is a power dependence of reduced scattering coefficient on wavelength. Once this is done, extrapolation circuitry 80 has carried this out, the analysis circuitry 78 will have an estimate of reduced scattering coefficient that is also continuous across wavelengths.

To recover the absorption coefficient across all wavelengths, one additional piece of information is required: the relationship between the transmittance slope described above, and the optical coefficients of the sample, namely the absorption coefficient and the reduced scattering coefficient of the sample. Once this relationship is known, the analysis circuitry 78 will be able to decouple the absorption coefficient from the transmittance slope that was measured by the first spectrometer 74.

The analysis circuitry 78 relies on any one of several methods to recover the relationship between the transmittance slope and the optical coefficients of the sample, to ultimately determine the absorption coefficient.

In some embodiments, the analysis circuitry 78 includes diffusion-theory circuitry 82 that implements an analytical solution to the diffusion equation. In such embodiments, the analysis circuitry 78 treats quanta of light as particles that diffuse through a medium. This is a model that is often used for light propagating through plasma, such as in the Sun. Such a method is equally applicable to light propagating through a turbid sample in a cuvette 14, once proper boundary conditions that represent the cuvette sides are considered.

In other embodiments, the analysis circuitry 78 includes numerical-solution circuitry 84 that implements a numerical solution of the diffusion equation, the more general radiative transfer equation, or the differential equations that govern propagation of electromagnetic waves generally and that incorporate the measurements provided by the first and second spectrometers 66, 68.

In still other embodiments, the analysis circuitry 78 includes simulation circuitry 86. Such embodiments of the analysis circuitry 78 rely on Monte-Carlo or other statistical simulations to model an ensemble of light quanta as undergoing their own respective random walks as they traverse the sample in the cuvette 14.

Also among the embodiments are those in which the analysis circuitry 78 avoids significant computation by having a look-up table 88 that has been created by making numerous empirical measurements with the cuvette 14 having been filled with samples of known optical properties in advance of making the measurements of the unknown turbid sample.

Figure 4:
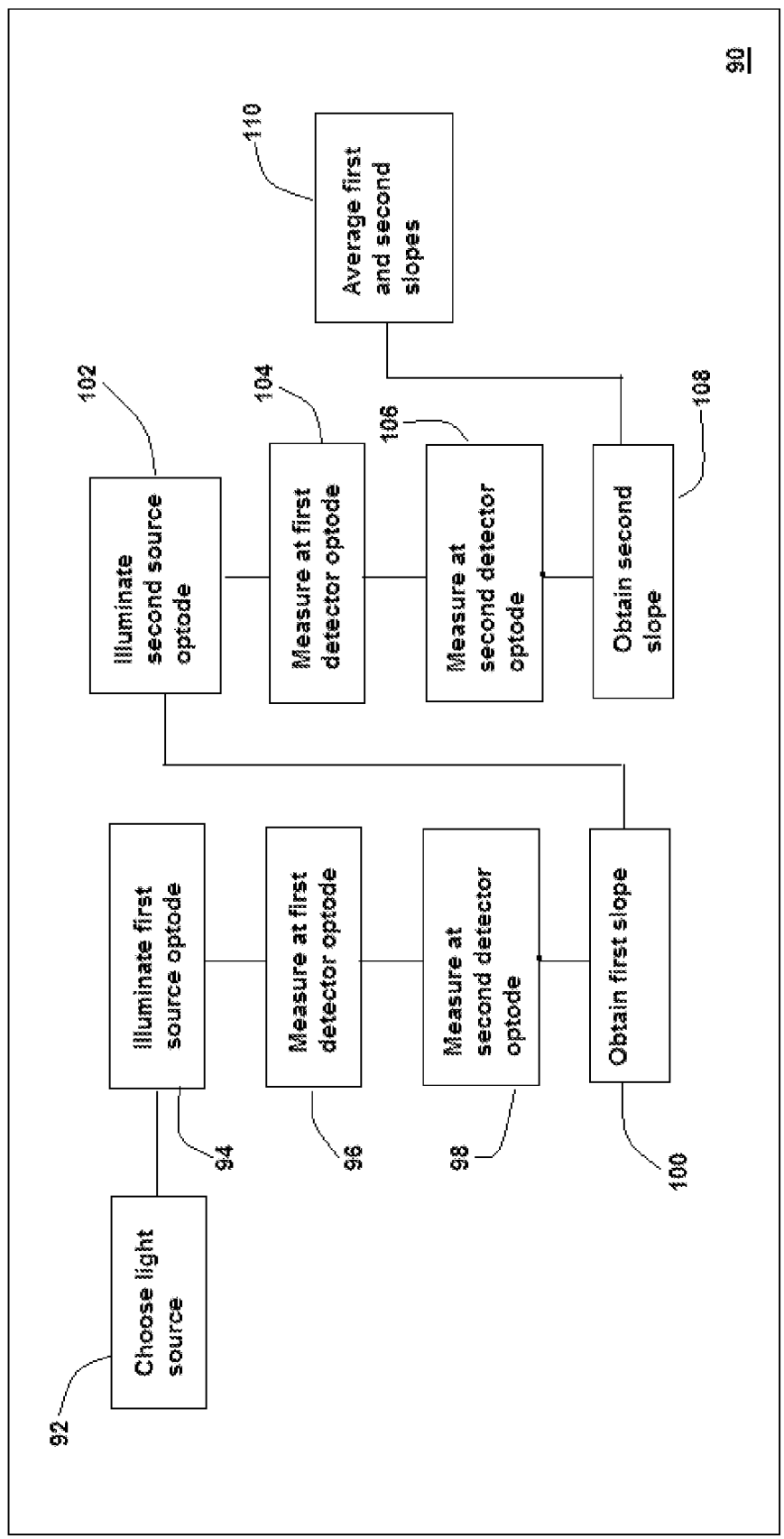
FIG. 4 shows a self-calibration procedure to be carried out by the spectrophotometer of FIG. 1.

Referring now to FIG. 4, in a self-calibration procedure 90, the illumination controller 52 chooses a light source (step 92) and directs light from that chosen light source to only the first optode 16 (step 94) thereby allowing measurements to be made from the third optode 24 (step 96) and from the fourth optode 26 (step 98). These measurements, together with the known geometry of the optodes 16, 24, 26 are then used to estimate a first slope (step 100). This estimate is made with no interfering light entering via the second optode 18. This corresponds to what is shown in FIG. 2.

Then, using the same chosen light source, the illumination controller 52 directs light to the second optode 18 (step 102), thereby allowing measurements to again be made from the third optodes 24 and from the fourth optode 26 (step 106). These measurements, together with the known geometry of the optodes 18, 24, 26 are then used to estimate a second slope (step 108). This corresponds to what is shown in FIG. 3.

The first and second slopes that result are then averaged (step 110) to provide an estimate of the actual dependence of transmittance through the turbid sample on the path length traversed by light through the turbid sample.

The illumination controller 52 carries out the procedure 90 shown in FIG. 4 for the broadband source 54, 56, for the first monochromatic source 58, 60, and for the second monochromatic source 62, 64.

The measurements that were made with illumination through the first and second optodes 16, 18 using the broadband sources 54, 56 are ultimately used by the first spectrometer 74 for estimating transmittance across a continuous range of wavelengths. Those measurements that were made while using the monochromatic sources 58, 60, 62, 64 are ultimately provided to the second spectrometer 76 to be used in estimating a scattering coefficient at the first and second wavelengths within the continuous range.

In some practices, the illumination controller 52 chooses among the light sources in series. However, in principle it is also possible to carry out the procedure shown in FIG. 4 in parallel. For example, it is possible to provide, to the first optode 16, a superposition of light that comes from the broadband source 54, the first monochromatic source 58, and the second monochromatic source 62 into the first optode 16. This procedure requires tagging the light from each source in some way, for example by modulating two of the three sources at different frequencies, so that they remain distinguishable at the third and fourth optodes 24, 26.

In some embodiments, the cuvette 14 is a prism. Among these are embodiments in which the prism has a square cross section and those in which it has a rectangular cross section. Also among the embodiments are those in which the cuvette 14 is a cylinder or a sphere.

Moreover, there is no requirement that the cuvette 14 have a constant cross section. Thus, embodiments include those in which the cuvette 14 is non-prismatic.

In some embodiments, the cuvette's faces are entirely transparent. In others, they are transparent only at the locations of the optodes 16, 18, 24, 26. Also among the embodiments are those in which the cuvette's inner walls are internally reflective and those in which they absorb light emitted through the first and second optodes 16, 18.

Having described the invention and a preferred embodiment thereof, what is claimed as new and secured by Letters Patent is:

1. An apparatus for analysis of light that has passed through a turbid sample in a cuvette, said turbid sample having a wavelength-dependent absorption coefficient and a wavelength-dependent reduced scattering coefficient, said apparatus comprising:
    a self-calibrating hybrid spectrophotometer that comprises:
        a receptacle for receiving said cuvette,
        first and second optodes that are configured to permit light to enter said cuvette when said cuvette has been received in said receptacle,
        third and fourth optodes that are configured to permit light to leave said cuvette when said cuvette has been received in said receptacle, and
        an illumination controller that is configured to control delivery of light to a selected one of said first and second optodes,
    wherein light entering at a source optode selected from the group consisting of said first and second optodes is received at said third and fourth optodes after having interacted with said turbid sample along different inter-optode paths having different path lengths,
    wherein measurements made at said third and fourth optodes in response to having selected said first optode for delivery of light into said cuvette provide a first slope of optical transmittance as a function of path length,
    wherein measurements made at said third and fourth optodes in response to having selected the second optode for delivery of light into said cuvette provide a second slope of optical transmittance as a function of path length, and
    wherein said self-calibrating hybrid spectrophotometer is configured to use said first and second slopes to identify a third slope, said third slope being indicative of said absorption coefficient and said reduced scattering coefficient of said turbid sample.

2. The apparatus of claim 1, wherein a first pair of paths comprises; a path that extends between said first optode and said third optode and a path that extends between said first optode and said fourth optode,
    wherein a difference between path lengths of said path in said first pair of paths defines a first path-length differential,
    wherein a difference between measurements made at said third and fourth optodes, when divided by said first path-length differential, defines said first slope,
    wherein a second pair of paths comprises: a path that extends between said second optode and said third optode and a path that extends between said second optode and said fourth optode,
    wherein a difference between path lengths of said paths in said second pair of paths defines a second path-length differential, and
    wherein a difference between measurements made at said third and fourth optodes, when divided by said second path-length differential, defines said second slope.

3. The apparatus of claim 1, wherein said self-calibrating hybrid spectrophotometer is configured to use said first and second slopes for self-calibration.

4. The apparatus of claim 1, wherein said third slope is between said first and second slopes.

5. The apparatus of claim 1, wherein said third slope is an average of said first and second slopes.

6. The apparatus of claim 1, further comprising first and second spectrometers that receive measurements from said third and fourth optodes.

7. The apparatus of claim 1, further comprising first and second spectrometers that receive measurements obtained at said third and fourth optodes, wherein said first spectrometer receives a measurement across a continuous range of wavelengths and said second spectrometer receives measurements at discrete first and second wavelengths that are within said range.

8. The apparatus of claim 1, further comprising a frequency-domain spectrometer and a continuous wave broadband spectrometer, both of which receive measurements made using said third and fourth optodes when at most one of said first and second optodes passes light into said cuvette.

9. The apparatus of claim 1, further comprising first and second illumination systems for providing light to said first and second optodes, respectively, each of said first and second illumination systems comprising a broadband source that provides light over a continuous range of wavelengths and monochromatic light sources for providing said first and second optodes with light at corresponding first and second wavelengths within said continuous range.

10. The apparatus of claim 1, further comprising analysis circuitry that determines said absorption coefficient and said reduced scattering coefficient based at least in part on measurements made at said third and fourth optodes.

11. The apparatus of claim 1, further comprising spectrometers and analysis circuitry that receives measurements from said spectrometers, wherein said analysis circuitry is configured to extract, from measurements made by said spectrometers, said absorption coefficient based on a relationship between said third slope and said absorption coefficient and a relationship between said third slope and reduced scattering coefficient.

12. The apparatus of claim 1, further comprising spectrometers and analysis circuitry that receives measurements from said spectrometers, wherein said analysis circuitry comprises diffusion-theory circuitry that implements a diffusion model that models said light as particles diffusing through said turbid medium, wherein said analysis circuitry is configured to determine said absorption coefficient and said reduced scattering coefficient based at least in part on a result of said diffusion model.

13. The apparatus of claim 1 further comprising spectrometers and analysis circuitry that receives measurements from said spectrometers, wherein said analysis circuitry comprises numerical-solution circuitry that numerically solves a differential equation that models propagation of light through said cuvette, wherein said analysis circuitry is configured to determine said absorption coefficient and said reduced scattering coefficient based at least in part on a solution to said differential equation.

14. The apparatus of claim 1, further comprising spectrometers and analysis circuitry that receives measurements from said spectrometers, wherein said analysis circuitry comprises simulation circuitry that implements a simulation of propagation of light through said cuvette and wherein said analysis circuitry is configured to determine said absorption coefficient and said reduced scattering coefficient based at least in part on a result of said simulation.

15. The apparatus of claim 1, further comprising spectrometers and analysis circuitry that receives measurements from said spectrometers, wherein said analysis circuitry comprises a lookup table that contains information indicative of a relationship between said third slope and said absorption coefficient and a relationship between said third slope and said reduced scattering coefficient, and wherein said analysis circuitry is configured to determine said absorption coefficient and said reduced scattering coefficient based at least in part on said lookup table.

16. A method for using a spectrophotometer for analysis of light that has passed through a turbid sample in a cuvette, said turbid sample having a wavelength-dependent absorption coefficient and a wavelength-dependent reduced scattering coefficient, said method comprising:
    inserting said cuvette, which contains said turbid sample, in a receptacle of said spectrophotometer;
    coupling first, second, third, and fourth optodes to said cuvette to permit light to enter said cuvette through said first and second optodes and to permit light to leave said cuvette through said third and fourth optodes;
    selecting a light source;
    illuminating said first optode with said light source;
    making a measurement at said third and fourth optodes, based on said measurement and locations of said first, third, and fourth optodes relative to each other;
    obtaining a first slope of optical transmittance as a function of path length;
    illuminating said second optode with said light source;
    making a measurement at said third and fourth optodes;
    based on said measurement and locations of said second, third, and fourth optodes relative to each other, obtaining a second slope of optical transmittance as a function of path length; and
    using said first and second slopes to obtain a third slope, said third slope being indicative of said absorption coefficient and said reduced scattering coefficient of said turbid sample.

17. The method of claim 16, further comprising:
    selecting said light source to be a broadband light source that provides illumination over a continuum of wavelengths within a range of wavelengths;
    selecting said light source to be a monochromatic light source at a first wavelength; and
    selecting said light source to be a monochromatic light source at a second wavelength, said first and second wavelengths being within said continuum of wavelengths.

18. The method of claim 16, further comprising estimating a wavelength-dependent absorption coefficient based at least in part on said third slope.

19. The method of claim 16, wherein using said first and second slopes to obtain a third slope comprises averaging said first and second slopes.

20. The method of claim 16, wherein using said first and second slopes to obtain a third slope comprises selecting said third slope to be between said first and second slopes.

* * * * *